United States Patent
Nagamine et al.

(10) Patent No.: US 9,800,347 B2
(45) Date of Patent: Oct. 24, 2017

(54) OPTICAL TRANSMISSION DEVICE, OPTICAL TRANSMISSION SYSTEM, AND OPTICAL TRANSMISSION CONTROL METHOD

(71) Applicant: FUJITSU LIMITED, Kawasaki-shi, Kanagawa (JP)

(72) Inventors: Kazuaki Nagamine, Ota (JP); Ichiro Nakajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 15/006,621

(22) Filed: Jan. 26, 2016

(65) Prior Publication Data

US 2016/0241936 A1 Aug. 18, 2016

(30) Foreign Application Priority Data

Feb. 17, 2015 (JP) .................................. 2015-028717

(51) Int. Cl.
*H04B 10/00* (2013.01)
*H04B 10/564* (2013.01)
*H04J 14/02* (2006.01)

(52) U.S. Cl.
CPC ........ *H04B 10/564* (2013.01); *H04J 14/0212* (2013.01); *H04J 14/0221* (2013.01); *H04J 14/0258* (2013.01); *H04J 14/0291* (2013.01)

(58) Field of Classification Search
CPC H04B 10/564; H04J 14/0212; H04J 14/0291; H04J 14/0258; H04J 14/0221
USPC ........................................................... 398/5
See application file for complete search history.

(56) References Cited

U.S. PATENT DOCUMENTS

| 6,795,610 B1* | 9/2004 | Meyer ................ G02B 6/29322 385/27 |
| 7,526,200 B2* | 4/2009 | Nakano ................ H04B 10/506 398/10 |
| 2009/0162067 A1* | 6/2009 | Kobayashi .......... H04J 14/0204 398/79 |
| 2010/0150563 A1* | 6/2010 | Nakajima ........ H04B 10/07955 398/81 |
| 2011/0020012 A1 | 1/2011 | Miyasaka et al. |
| 2013/0121691 A1* | 5/2013 | Oda .................... H04J 14/0221 398/34 |

FOREIGN PATENT DOCUMENTS

| JP | 2003-069455 | 3/2003 |
| JP | 2011-4227 | 1/2011 |

* cited by examiner

*Primary Examiner* — Juan A Torres
(74) *Attorney, Agent, or Firm* — Staas & Halsey LLP

(57) ABSTRACT

An optical transmission device in an optical network in which a first optical path and a second optical path are set, the optical transmission device locating on the second optical path, the optical transmission device includes; a storage unit configured to store control data for a control of an optical transmission power to the second optical path, the control being performed based on a training signal received through the second optical path; and a controller configured to control the optical transmission power to the second optical path, based on the control data stored in the storage unit, according to a detection of an optical path change by which an optical path transmitting a main signal is changed from the first optical path to the second optical path.

9 Claims, 14 Drawing Sheets

OPTICAL TRANSMISSION DEVICE, OPTICAL TRANSMISSION SYSTEM, AND OPTICAL TRANSMISSION CONTROL METHOD

CROSS-REFERENCE TO RELATED APPLICATIONS

This application is based upon and claims the benefit of priority from the prior Japanese Patent Application No. 2015-028717 filed on Feb. 17, 2015, the entire contents of which are incorporated herein by reference.

FIELD

The embodiments discussed herein are related to an optical transmission device, an optical transmission system, and an optical transmission control method.

BACKGROUND

A wavelength division multiplexing (WDM) optical transmission technology has been known as one of optical communication techniques. In the WDM optical transmission technology, a route of an optical path having a predetermined wavelength multiplexed in the WDM light may be changed. A route change of an optical path may occur when a failure occurs in an optical path, or may occur according to a readjustment or an optimization of an optical WDM network.

Related techniques are disclosed in, for example, Japanese Laid-open Patent Publication No. 2003-069455 and Japanese Laid-Open Patent Publication No. 2011-004227.

SUMMARY

According to an aspect of the invention, an optical transmission device in an optical network in which a first optical path and a second optical path are set, the optical transmission device locating on the second optical path, the optical transmission device includes; a storage unit configured to store control data for a control of an optical transmission power to the second optical path, the control being performed based on a training signal received through the second optical path; and a controller configured to control the optical transmission power to the second optical path, based on the control data stored in the storage unit, according to a detection of an optical path change by which an optical path transmitting a main signal is changed from the first optical path to the second optical path.

The object and advantages of the invention will be realized and attained by means of the elements and combinations particularly pointed out in the claims.

It is to be understood that both the foregoing general description and the following detailed description are exemplary and explanatory and are not restirctive of the invention, as claimed.

DESCRIPTION OF EMBODIMENTS

Figure 1:
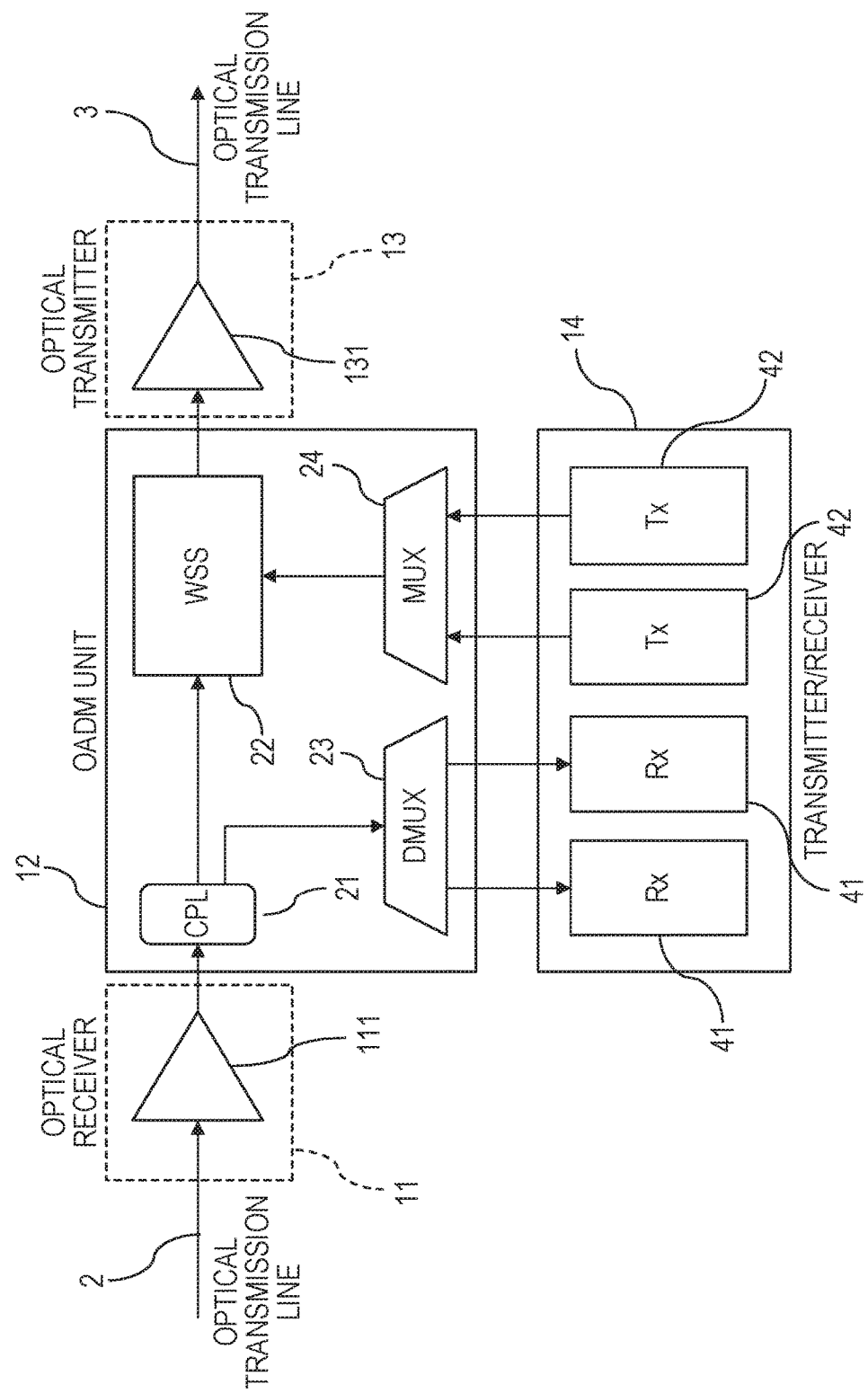
FIG. 1 is a block diagram illustrating an exemplary configuration of an optical transmission device according to an exemplary embodiment.

In an optical WDM network, an optical power level is controlled and adjusted for each wavelength according to a change of an optical path. However, a long time may be required for the control and adjustment of the optical power level, and also it may take time until an optical path of a changed destination is stably communicated and placed in an available state.

Accordingly, a substantially large delay may occur in a relief processing by an additional optical path in a case where a failure occurs in an optical path, or in a readjustment or optimization of an optical WDM network.

Hereinafter, descriptions will be made on an exemplary embodiment of a technology that makes it possible to shorten a processing time of an optical path change, with reference to drawings. However, the exemplary embodiment described below is merely illustrative and is not intended to exclude various modifications or applications of techniques not specified below. Also, various exemplary embodiments described below may be carried out in proper combinations. In the drawings used in the following exemplary embodiment, portions denoted by the same reference numerals, unless otherwise specified, represent the same or similar parts.

FIG. 1 is a block diagram illustrating an exemplary configuration of an optical transmission device according to an exemplary embodiment. An optical transmission device 1 illustrated in FIG. 1 is, for example, an optical add-drop multiplexer (OADM).

The OADM 1 may include, for example, an optical receiver 11, an OADM unit 12, an optical transmitter 13, and an optical transmitter/receiver 14. Although not illustrated in FIG. 1, a device controller configured to control the overall operation of the OADM 1 may be provided in the OADM 1.

One or both of the optical transmitter 13 and the optical transmitter/receiver 14 may not be provided in the OADM 1.

The "optical transmission device" is an example of an element of an optical network (or may be referred to as an "optical transmission system") (NE). The "optical transmission device" may be referred to as an "optical transmitting node" or simply referred to as a "node" or a "station."

The optical receiver 11 receives and amplifies light transmitted through an input optical transmission line 2 (e.g., WDM light). Accordingly, the optical receiver 11 may include an optical amplifier 111. The optical amplifier 111 may be referred to as a preamplifier 111 or a receiving amplifier 111.

The optical transmitter 13 amplifies a transmission light (e.g., WDM light) input from the OADM unit 12, and transmits the amplified light to an output optical transmission line 3. Accordingly, the optical transmitter 13 may include an optical amplifier 131. The optical amplifier 131 may be referred to as a post-amplifier 131 or a transmission amplifier 131.

At the one or both of the optical amplifiers 111 and 131, for example, a rare earth doped optical fiber amplifier such as an erbium-doped optical fiber amplifier (EDFA) may be applied.

The OADM unit 12 includes functions of dropping, adding or passing through the light of any one wavelength (which may be referred to as a "channel") included in WDM light.

For example, the OADM unit 12 may transmit the received WDM light input from the optical receiver 11 to an optical transmission line of another route (Degree) by a wavelength unit of light included in the corresponding WDM light, split (drop) the WDM light toward the optical transmitter/receiver 14, or allow the WDM light to pass therethrough toward the optical transmitter 13. The "optical transmission line of another route" refers to, for example, an optical transmission line corresponding to a route different from the optical transmission lines (2 and 3) illustrated in FIG. 1.

The OADM unit 12 may insert (add) WDM light received from an optical transmission line of another route, or light transmitted from the optical transmitter/receiver 14, by a wavelength unit, into (to) the received WDM light input from the optical receiver 11.

Therefore, the OADM unit 12 may include, as illustrated in FIG. 1, an optical coupler (CPL) 21, a wavelength selection switch (WSS) 22, a wavelength separator 23, and a wavelength multiplexer 24. The wavelength separator 23 may be referred to as a demultiplexer (DMUX), and the wavelength multiplexer 24 may be referred to as a multiplexer (MUX). The configuration of the OADM unit 12 is not limited to the configuration illustrated in FIG. 1.

The CPL 21, for example, splits the WDM light input from the optical receiver 11, and outputs the diverged lights to the wavelength separator 23 and the WSS 22. The output destinations of the diverged lights in the CPL 21 may include an optical transmission line of another route. The diverged light output to the wavelength separator 23 may be referred to as "drop light," and the diverged light output to the WSS 22 may be referred to as "through light."

The WSS 22, for example, selects and outputs the through light input from the CPL 21, and the add light input from the wavelength MUX 24, by a wavelength unit, to the optical transmitter 13. A wavelength selection target in the WSS 22 may include any one wavelength included in the WDM light input from an optical transmission line of another route.

In order to achieve the add/drop/through functions as described above, the WSS 22, for example, may include a function of connecting the WDM light input to an input port to any one output port, by a wavelength unit, and a function of adjusting an optical transmission power by a wavelength unit. The "adjustment of the optical transmission power" may be performed by adjusting the attenuation amount (or loss) of light.

The connection function between the input/output ports may be referred to as an "optical switch function." The adjustment function of an optical transmission power may be referred to as an attenuation function. With regard to the attenuation function, the WSS 22 is an example of a variable optical attenuator (VOA).

The optical switch function and the attenuation function of the WSS 22 may be achieved, for example, using an element which is capable of spatially varying the reflection direction of input light (beam) and changing the internal optical route. The corresponding element may be referred to as a "spatial light modulator."

As for the spatial light modulator, an element using a technology of liquid crystal on silicon (LCOS) or a technology of micro electro mechanical system (MEMS) may be exemplified. The spatial light modulator may adjust the wavelength of optical beam to be coupled to the output port or optical power by adjusting a spatial reflection direction of the input optical beam.

Accordingly, the spatial light modulator may vary a transmission band of light for the output port, and vary the power of the light output from the output port (e.g., an attenuation amount).

Such a spatial light modulator may be employed in the WSS 22 such that in the optical transmission device 1 (e.g., the OADM unit 12), a "flexible grid" may be supported. The transmission band of the WSS 22 may be referred to as a "WSS transmission band."

Figure 2:
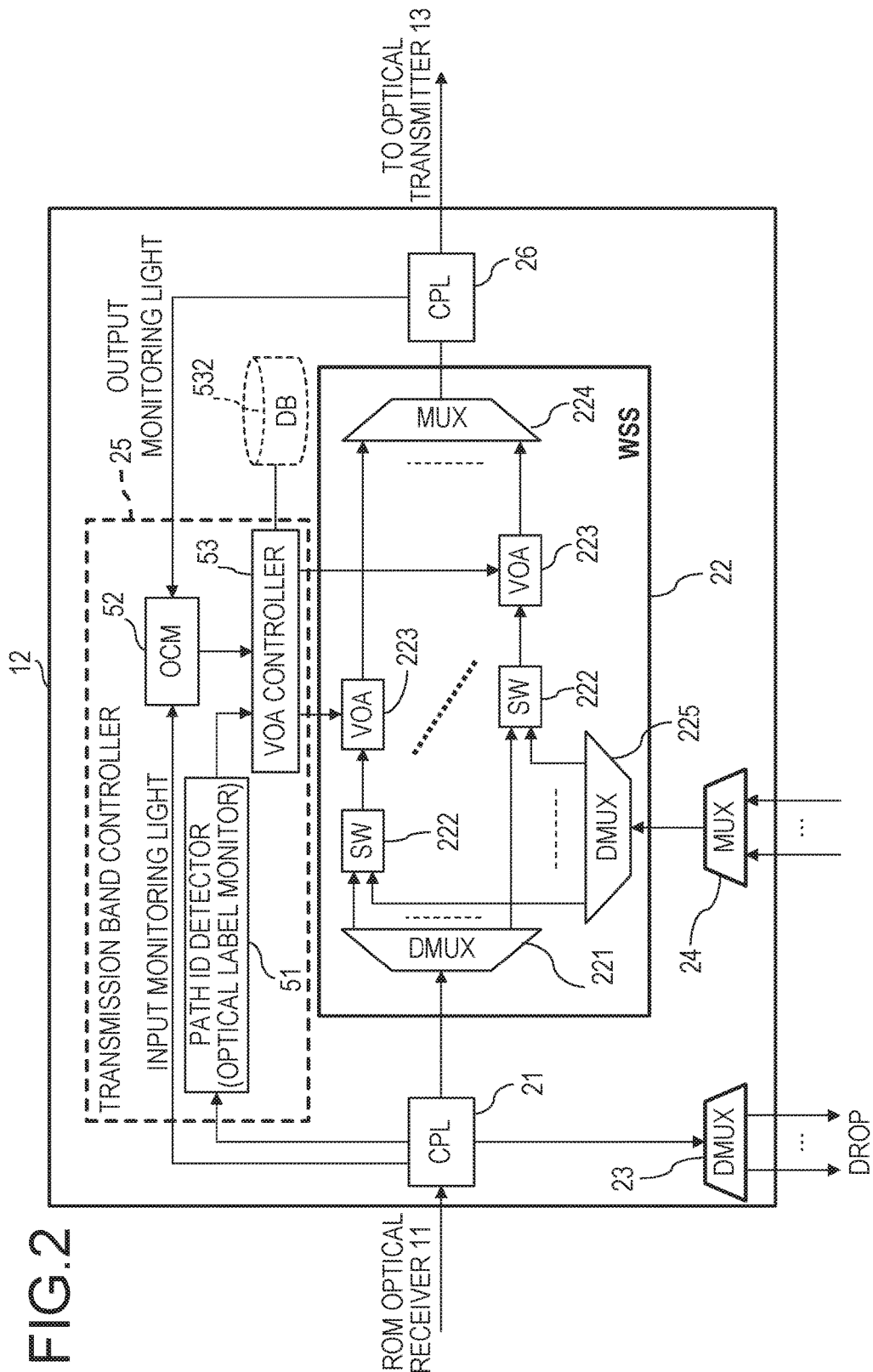
FIG. 2 is a block diagram illustrating an exemplary configuration of an OADM unit illustrated in FIG. 1.

FIG. 2 illustrates a block diagram which focuses on an exemplary functional configuration of the WSS 22. As illustrated in FIG. 2, the WSS 22 may functionally include wavelength separators (demultiplexers: DMUXs) 221 and 225, an optical switch (SW) 222, a variable optical attenuator (VOA) 223, and a wavelength multiplexer (multiplexer: MUX) 224.

A plurality of SWs 222 and a plurality of VOAs 223 may be provided according to, for example, the number of multiplexed wavelengths of the WDM light (i.e., the number of channels). As a non-limiting example, each SW 222 and each VOA 223 may be provided for each channel.

The DMUX 221 divides the WDM light input from the CPL 21 by a wavelength unit and inputs the divided WDM light to each SW 222. The light input from the CPL 21 to the DMUX 221 may be, for example, any one of a through light, and a hub light that interconnects different routes.

The DMUX 225 divides the WDM light (add light) input from the MUX 24 by a wavelength unit, and inputs the divided light to each SW 222.

Each of the SWs 222 selects any one of wavelengths of light input from the DMUXs 221 and 225 according to the wavelength setting, and outputs the light of the wavelength to the VOA 223. The wavelength setting for the SW 222 may be performed by the device controller described above.

The VOA 223 adjusts an attenuation amount of the light input from the corresponding SW 222 to control an optical transmission power. It may be considered that the VOA 223 corresponds to the "attenuation function" described above. The attenuation amount of light in the VOA 223 may be adjusted by controlling variable optical loss (which may be referred to as "VOA loss") included in the VOA 223.

The MUX 224 wavelength-multiplexes the lights of respective wavelengths of which the optical transmission power have been adjusted in each of the VOAs 223, and outputs the multiplexed light to, for example, the optical transmitter 13 (the post-amplifier 131).

Each of the through light and the hub light is divided by a wavelength unit in the DMUX 221, and the add light is divided in the DMUX 225 by a wavelength unit, and then each divided light is input to the SW 222. The SW 222 selects any one of the add light, the through light, and the hub light to be passed therethrough. It may be considered that the DMUXs 221 and 225, and the SWs 222 correspond to a "port switch function" as described above.

The attenuation amount of the light which has passed through the SW 222 is adjusted in the VOA 223. The light is then input to the MUX 224, wavelength-multiplexed in the MUX 224, and output to the optical transmitter 13 (the post-amplifier 131).

It may be considered that the DMUXs 221 and 225, the SWs 222, the VOAs 223, and the MUX 224 correspond to a spatial light modulator as described above. Accordingly, the WSS 22 is an example of a highly functional optical device that integrally includes respective functions of the spatial light modulator. Such a WSS 22 may be applied to an optical switch function portion of the node 1 so as to improve the expandability of the node 1 or to achieve a cost reduction.

The wavelength selection in the SW 222 may be controlled by, for example, a transmission band controller 25 (or the above described device controller). Also, the attenuation amount (VOA loss) of the VOA 223 may be controlled by, for example, a VOA controller 53.

The VOA controller 53 may be provided in the transmission band controller 25. The transmission band controller 25 may be referred to as "a level controller 25" by focusing on a VOA function by the VOA controller 53.

The VOA controller 53, for example, based on a monitoring value of an optical channel monitor (OCM) 52, controls the VOA loss such that the output optical power of the WSS 22 (hereinafter, which may be referred to as a "WSS output optical power") coincides with a target power level. The "target power level" may be referred to as a "target value," or may be simply referred to as a "target level."

The OCM 52 is capable of monitoring the wavelength and power of input light and output light of the WSS 22. For example, a diverged light split from the CPL 21 may be input as an input monitoring light to the OCM 52. Also, for example, a diverged light of a part of an output light of the WSS 22, which is split (which may be referred to as "tap") by an CPL 26, may be input as an output monitoring light to the OCM 52.

The function of the CPLs 21 and 26 illustrated in FIG. 2 may be implemented using an optical splitter (SPL) or a WSS. The transmission band controller 25 may be a separate controller from the above described device controller, or may be incorporated, as one function of a device controller, into the corresponding device controller.

The transmission band controller 25 may include, as illustrated in FIG. 2, a path ID detector 51. The path ID detector 51 detects a path ID of light input to the WSS 22. The "detection" may be referred to as "monitoring," and the "path ID" may be referred to as an "optical label." Therefore, the path ID detector 51 may be referred to as an optical label monitor 51.

The "optical label" is an example of information which is capable of identifying (detecting) a route (which may be referred to as "an optical path" or "a wavelength path") through which a light with a predetermined wavelength is transmitted in an optical network.

The optical label information (which may be referred to as "optical label data") may be, for example, superimposed on a main signal light in an optical transmitter provided in a transmission node that transmits the corresponding light.

For example, the optical label information may be superimposed on the main signal light, as a frequency-modulated (FM) tone signal. The FM tone signal superimposed on the main signal light may be referred to as a "sub-signal" for the "main signal."

Since the optical label information superimposed, as the sub-signal, on the main signal light is frequency-modulated, a center frequency of a spectrum varies in a frequency axis direction. A reception node of a main signal light is capable of detecting the optical label information by detecting the variation of the center frequency of the corresponding spectrum.

Accordingly, the optical label monitor 51 illustrated in FIG. 2 is capable of detecting the optical label information by detecting a frequency variation of a spectrum of light input to the WSS 22. The configuration and operation on the detection of the optical label information in the optical label monitor 51 will be described later in FIG. 5.

Referring back to the description of FIG. 1, the DMUX 23 performs wavelength separation of the drop light input from the CPL 21 and outputs the wavelength-separated lights to optical receivers (Rxs) 41 of the optical transmitter/receiver 14. When the Rx 41 is capable of receiving a coherent signal, the Rx 41 may select and receive a light of a desired receiving wavelength even when lights with a plurality of different wavelengths are input. Accordingly, the DMUX 23 may be replaced with an optical coupler that splits the input drop light for the Rxs 41.

The MUX 24 wavelength-multiplexes the add lights input from optical transmitters (Txs) 42 of the optical transmitter/receiver 14, and outputs the wavelength-multiplexed light to the WSS 22.

One or both of the DMUX 23 and the MUX 24 may be constituted using a transmission band variable filter such as a WSS, an optical coupler, or the like.

The optical transmitter/receiver 14 may be referred to as a transponder 14, and may include one or more Rxs 41 as an example of an optical receiving unit, and one or more Txs 42 as an example of an optical transmitting unit.

Figure 3:
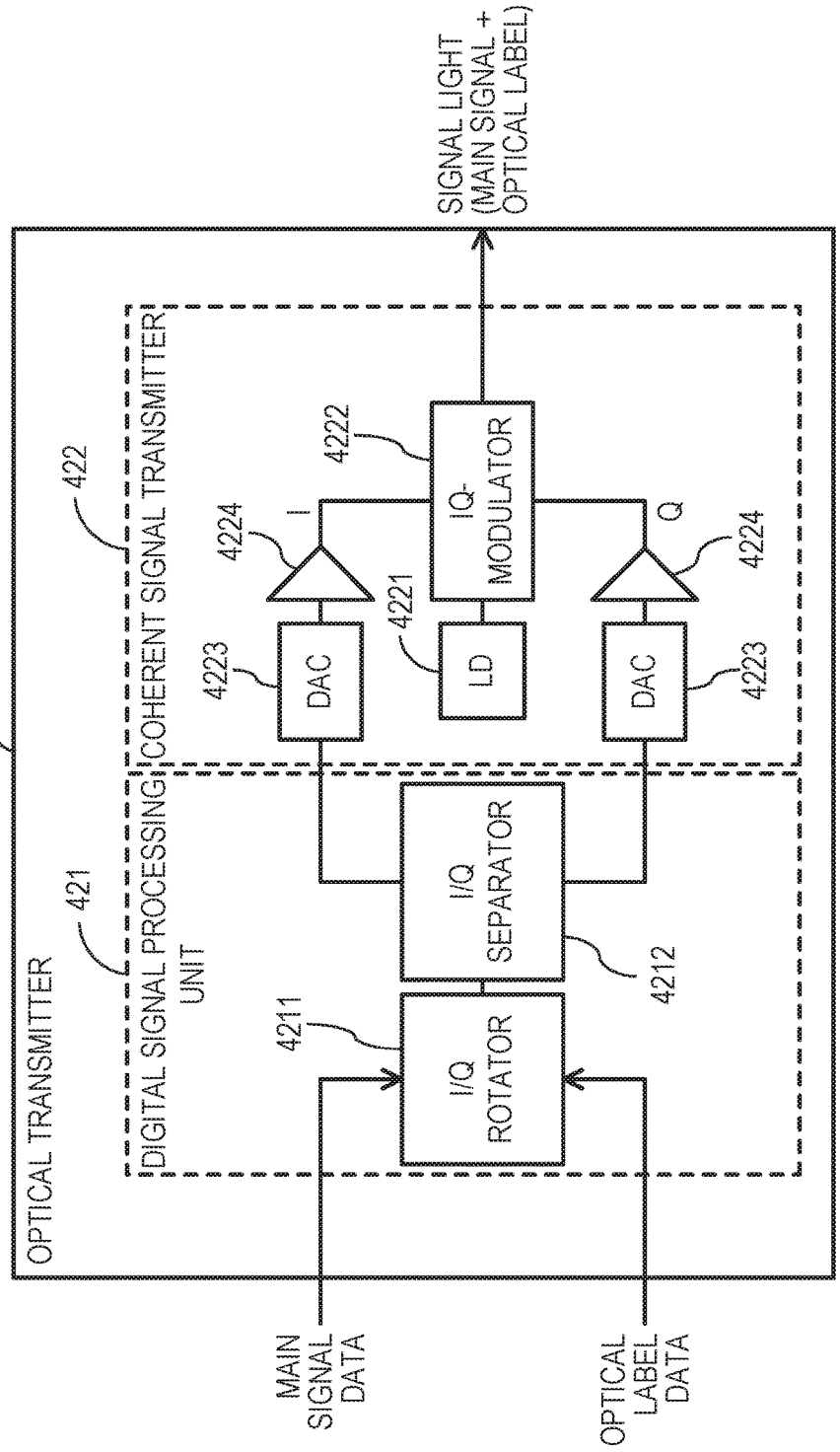
FIG. 3 is a block diagram illustrating an exemplary configuration of an optical transmitter illustrated in FIG. 1.
Figure 4:
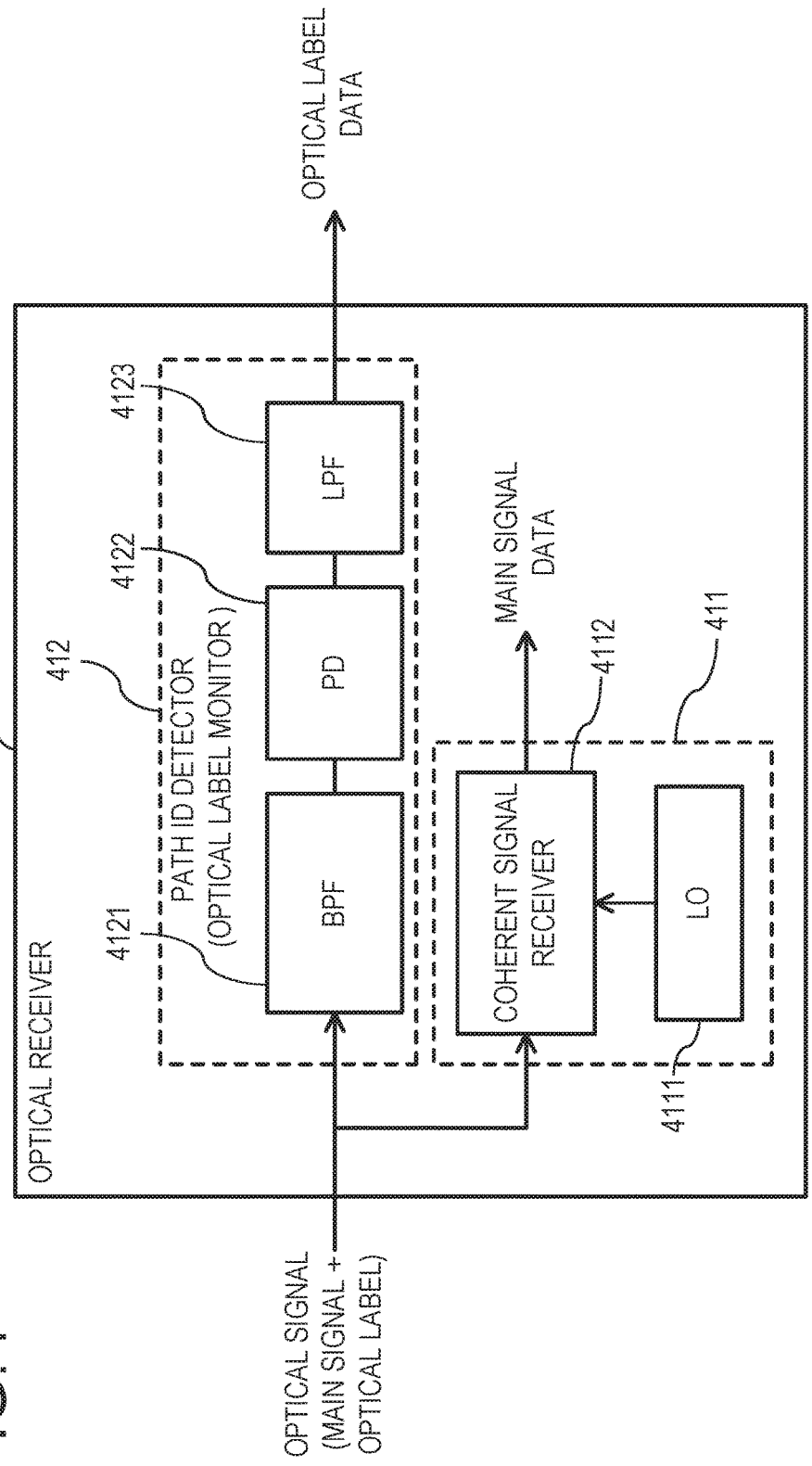
FIG. 4 is a block diagram illustrating an exemplary configuration of an optical receiver illustrated in FIG. 1.

FIG. 3 is illustrates an exemplary configuration of a Tx 42, and FIG. 4 illustrates an exemplary configuration of an Rx 41. As illustrated in FIG. 3, the Tx 42 includes, for example, a digital signal processing unit 421, and a coherent signal transmitter 422.

The digital signal processing unit 421 performs a digital signal processing on a transmission digital signal. The digital signal processing unit 421 may employ a processor circuit or device having a computing capability such as a digital signal processor (DSP).

The transmission digital signal may include one or both of main signal data and optical label information. The transmission digital signal may also include a training signal (which may be referred to as a "pilot signal").

The training signal may be, for example, a signal conventionally known in an NE of an optical network. The training signal may be a signal that is temporarily transmitted through a standby path, as described below.

The optical label information may be provided to the Tx 42 from a network management system (NMS, not illustrated) which manages the optical network. That is, the optical label information may be allocated to each Tx 42, from the NMS.

The optical label information may be, for example, a code with a predetermined length which identifies an optical path. An "identification of an optical path" may be regarded as "monitoring of an optical path." Therefore, the optical label information superimposed on the main signal light may be considered to be equivalent to "a monitoring signal" or "a supervisory (SV) light" of an optical path.

To the Txs 42 with different transmission wavelengths, orthogonal codes which are orthogonal to each other may be allocated as monitoring signals. The monitoring signals may be FM tone signals having different frequencies.

The FM tone signal may be, as a non-limiting example, a sinusoidal signal. The speed of the monitoring signal (e.g., a bit rate of a code, a frequency of a FM tone signal, or the like) may be sufficiently slow with regard to a speed of main signal data.

Therefore, as illustrated below in FIGS. 4 and 5, it is sufficient that photo detectors 4122 and 512 used for optical label monitors 412 and 51 for detecting the optical label information are able to perform detection at a sufficiently low speed with regard to a speed of main signal data.

The transmission digital signal processed in the digital signal processing unit 421 may be modulated by a modulation scheme such as, for example, Quadrature Phase Shift Keying (QPSK), Quadrature Amplitude Modulation (QAM) or the like.

The modulation of the transmission digital signal may be used in combination with a polarization multiplexing technology for mapping signals to each of different polarization components of light. As a non-limiting example, Dual Polarization (DP)-QPSK, Polarization Mode (PM)-QPSK or the like may be used to modulate the transmission digital signal.

For example, the transmission digital signal may be mapped to a transmission symbol that is represented in a constellation map (a complex plane or an IQ plane) in the digital signal processing unit 421. The transmission symbol is represented by an in-phase component (I component) and a quadrature phase component (Q component) on an IQ plane, and respective components may be subjected to phase rotation and separation.

A phase rotation may be performed by an I/Q phase rotator (I/Q rotator) 4211, and a separation of an I-component digital signal and a Q-component digital signal may be performed by an I/Q separator 4212.

Each of the I-component digital signal and the Q-component digital signal separated by the I/Q separator 4212 is, for example, used for a driving signal of an IQ modulator 4222 provided in the coherent signal transmitter 422. The IQ modulator 4222 is an example of an optical modulator.

For example, the coherent signal transmitter 422 includes, for each of the I component and the Q component, a digital-analog converter (DAC) 4223, and a driver amplifier 4224.

The I component digital signal and the Q component digital signal are converted into analog signals by the corresponding DACs 4223, respectively, amplified by the driver amplifiers 4224, respectively, and provided to the drive electrodes installed for an I arm and a Q arm of the IQ modulator 4222.

The IQ modulator 4222 includes an optical waveguide that constitutes the I arm, and an optical waveguide that constitutes the Q arm, and a continuous light which is an output light of a light source 4221 propagates through each optical waveguide.

The light source (which may be referred to as a "transmission light source") 4221 may employ, for example, a semiconductor laser diode (LD), and the LD may be a wavelength-variable tunable LD. By changing an emission wavelength of the tunable LD, the wavelength (i.e., transmission wavelength) of a transmission signal light of the Tx 42 may be changed.

The driving signals are provided according to the I component and the Q component of the transmission digital signal from the driver amplifiers 4224 to the drive electrodes provided to correspond to optical waveguides that constitute the I arm and the Q arm, respectively. By the corresponding driving signals, the phase of a light propagating through each optical waveguide is changed according to the transmission digital signal.

The interference of the light that has propagated through each optical waveguide is changed depending on the change of the corresponding optical phase, so that flashes of light occur according to the transmission digital signal. That is, the output light of the light source 4221 is modulated by the driving signals according to the transmission digital signal in the IQ modulator 4222, and a modulated signal light is generated as a main signal light. In the corresponding modulated signal light, the optical label information which has been subjected to the digital signal processing and the main signal data may be superimposed as an FM tone signal.

If the optical label information does not need to be superimposed on the main signal, the Tx 42 may not perform a digital signal processing of optical label information in the digital signal processing unit 421. That is, the Tx 42 does not need to have a superimposing function of the optical label information.

Hereinafter, with reference to FIG. 4, the exemplary configuration of the Rx 41 will be described. The Rx 41 illustrated in FIG. 4, for example, may include an optical receiving unit 411, and an optical label monitor 412. The optical label monitor 412 may have the same configuration as that of the optical label monitor 51, as illustrated in FIG. 2 (which will be described below with reference to FIG. 5), or may be optionally configured.

The optical receiving unit 411, for example, includes a local oscillator (LO) 4111, and a coherent signal receiver 4112.

The LO 4111 outputs a local light used for a coherent signal reception (which may be referred to as "detection") in the coherent signal receiver 4112. It may be considered that the wavelength of the local light corresponds to a receiving wavelength of the Rx 41.

In the same manner as the transmission light source 4221 as illustrated in FIG. 3, the LO 4111 may employ a semiconductor LD, which may be a wavelength-variable tunable LD. By changing the wavelength of the tunable LD, the wavelength of light which is detected and demodulated by the coherent signal receiver 4112, that is, a receiving wavelength of the Rx 41, may be changed.

The coherent signal receiver 4112 allows the oscillated light of the LO 4111 to interfere with a receiving signal light, for example, at the same phase and different phases by an optical phase hybrid (e.g., a 90°-difference phase). Accordingly, an optical signal (electric field complex information) of a wavelength corresponding to a desired reception channel, among wavelengths included in the received WDM light, is detected and demodulated. Accordingly, as described above, even when WDM light is input to the coherent signal receiver 4112, the coherent signal receiver 4112 is able to select and receive a light with a desired receiving wavelength.

The coherent signal receiver 4112 may include a digital signal processor such as a DSP (not illustrated). A phase noise or a polarization fluctuation of the receiving signal light may be compensated through a digital signal processing by the corresponding digital signal processor.

The optical label monitor 412, in the same manner as the optical label monitor 51 as illustrated in FIG. 2, detects the optical label information superimposed on the receiving signal light. For example, the optical label monitor 412 illustrated in FIG. 4 may include an optical band pass filter (BPF) 4121 of a narrow band, a photo detector (or a photo diode) (PD) 4122, and a low pass filter (LPF) 4123.

Figure 5:
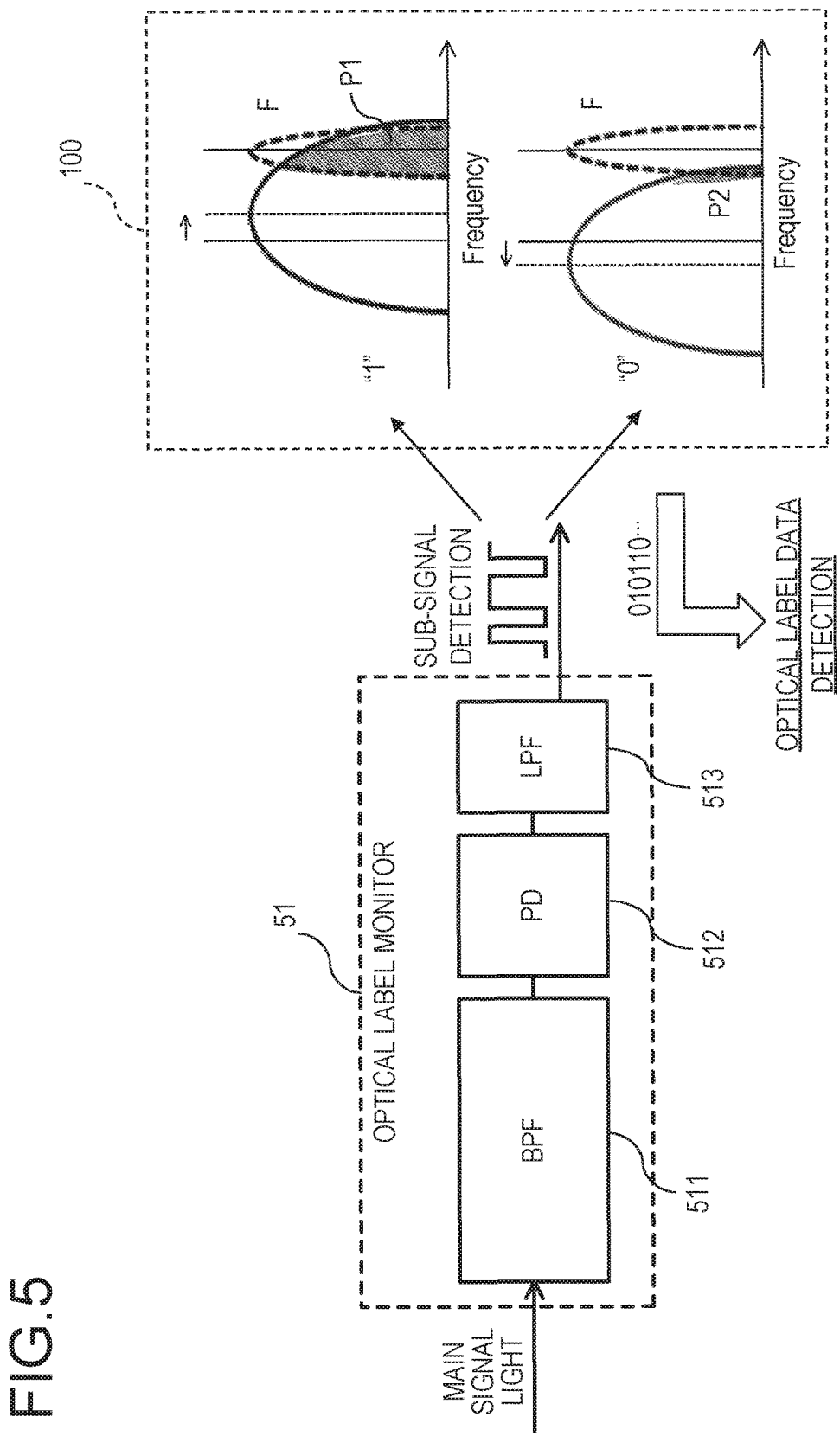
FIG. 5 is a block diagram illustrating an exemplary configuration of a path ID detector illustrated in FIGS. 2 and 4.

These elements 4121 to 4123 may be the same as or similar to elements 511 to 513 of the optical label monitor 51 illustrated in FIG. 5, respectively. Therefore, the descriptions for the elements 4121 to 4123 will be described below while replaced by descriptions for the elements 511 to 513, respectively, for convenience.

In FIG. 5, a BPF 511 is, for example, a narrow band BPF, and allows a band component of a received WDM light (i.e., a main signal light) corresponding to a shoulder portion of a narrow band pass characteristic of the BPF 511 to pass therethrough toward the PD 512. For example, the pass band characteristic of the BPF 511 is represented by a dotted line F in the dotted line frame 100 in FIG. 5.

The center frequency of a band pass component input to the PD 512 through the BPF 511 is varied in a frequency axis direction when optical label information (e.g., a sub-signal) indicated by the FM tone signal is superimposed on the main signal light.

The PD 512 converts the band pass component input from the BPF 511 into an electrical signal according to a corresponding optical power. That is, the output electrical signal of the PD 512 indicates a power of an output light of the BPF 511.

Here, the output optical power of the BPF 511 corresponds to an area of a region indicated by the oblique lines in the pass band characteristic F. For example, as illustrated in the upper side of the dotted line frame 100, when the center frequency of the band pass component of the BPF 511 is varied in the right direction with respect to a frequency axis according to the optical label information superimposed on the main signal light, the band pass component of the BPF 511 is increased. Here, the output optical power of the BPF 511 is indicated by P1 corresponding to the area of the oblique line region.

Meanwhile, as illustrated in the lower side of the dotted line frame 100, when the center frequency of the band pass component of the BPF 511 is varied in the left direction with respect to a frequency axis according to the optical label information superimposed on the main signal light, the band pass component of the BPF 511 is decreased. Here, the output optical power of the BPF 511 is indicated by P2 corresponding to the area of the oblique line region.

Accordingly, a bit "1" may be assigned to the output optical power P1, and a bit "0" may be assigned to the output optical power P2 so that a bit sequence according to the optical label information superimposed on the main signal may be detected.

The LPF 513, for example, averages an output electrical signal of the PD 512 by removing the frequency component of the output electrical signal of the PD 512. As described above, when the operation speed of the PD 512 is sufficiently low with respect to a symbol rate of the main signal data, the output electrical signal of the PD 512 becomes a time-averaged signal at the PD 512.

As described above, the optical label monitor 51 is capable of detecting or monitoring the optical label information superimposed on the main signal light as a frequency-modulated component.

Figure 6:
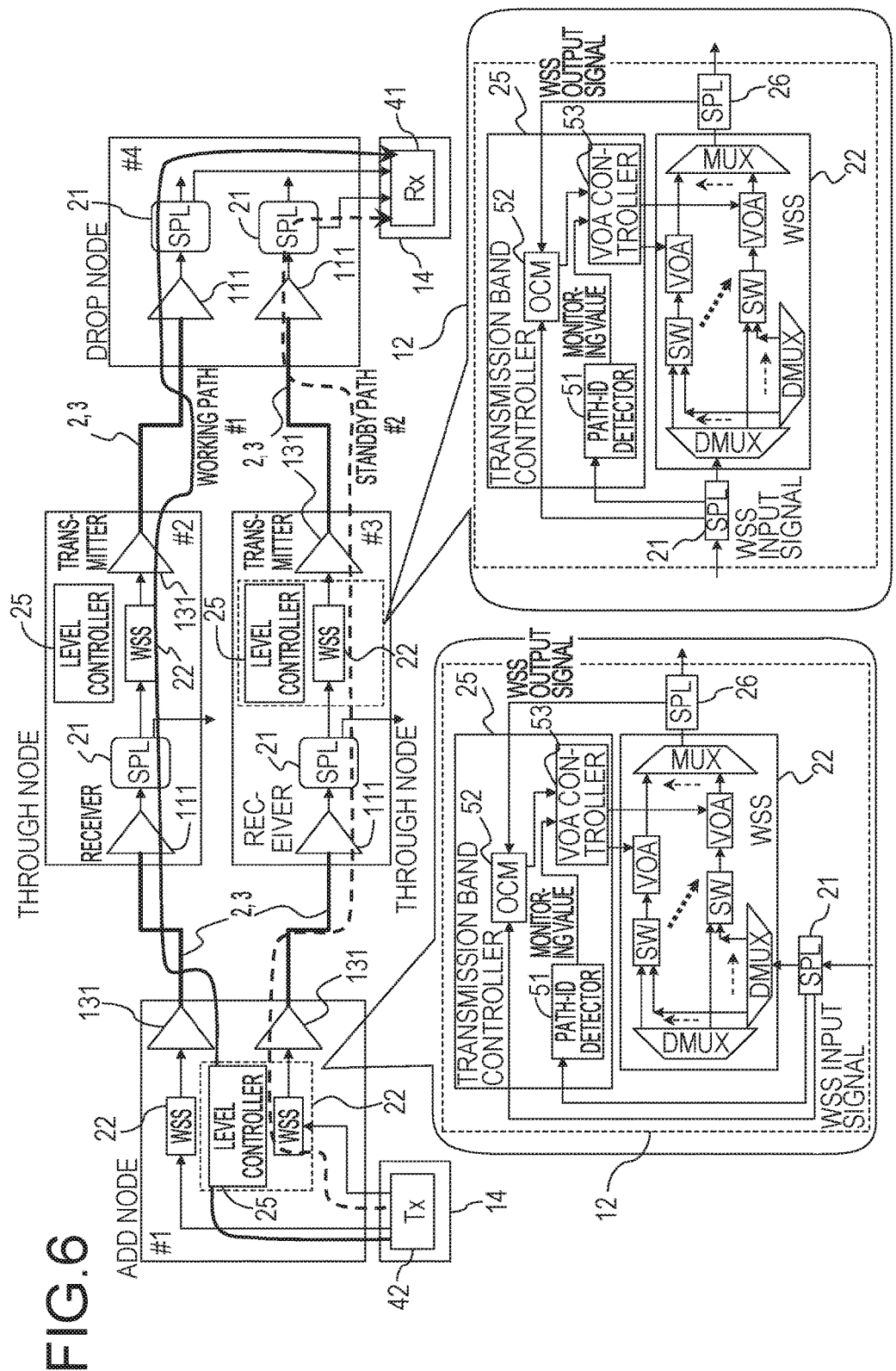
FIG. 6 is a block diagram illustrating an exemplary configuration of an optical transmission system according to an exemplary embodiment.

Then, FIG. 6 illustrates an exemplary configuration of an optical network that includes the above described node 1 as an NE. The optical network illustrated in FIG. 6, for example, includes four nodes #1 to #4.

A node #1 is, for example, an "add node" as an example of a transmission node. Each of nodes #2 and #3 is a "through node" as an example of a relay node. A node #4 is a "drop node" as an example of a reception node.

The add node #1 may be considered to be equivalent to a node available for an add function in the configuration of the node 1 illustrated in FIGS. 1 to 3. Each of the through nodes #2 and #3 may be considered to be equivalent to a node available for a through function in the configuration of the node 1 illustrated in FIGS. 1 to 3. The drop node #4 may be considered to be equivalent to a node available for a drop function in the configuration of the node 1 illustrated in FIGS. 1 to 4.

In FIG. 6, the through nodes #2 and #3 are, for example, provided for different optical paths #1 and #2 between the add node #1 and the drop node #4. The optical path #1 is an example of "a first optical path," and the optical path #2 is an example of "a second optical path."

Two or more through nodes may be provided for each of the optical paths #1 and #2. The number of the through nodes provided for each of the optical paths #1 and #2 may be either the same or different.

The add node #1 is capable of transmitting a WDM light to any of the optical paths #1 and #2. That is, the add node #1 corresponds to a "transmission node" or a "start node" of each of the optical paths #1 and #2.

The WDM light transmitted from the add node #1 to the optical path #1 is transmitted to the drop node #4 through the through node #2 of one side. The WDM light transmitted from the add node #1 to the optical path #2 is transmitted to the drop node #4 through the through node #3 of the other side. The drop node #4 corresponds to a "reception node" or an "end node" of each of the optical paths #1 and #2.

Here, one side of the optical paths #1 and #2 may be set as a working path, and the other side of the optical paths #1 and #2 may be set as a standby path for the working path (e.g., a protection path or a restoration path). The setting of the optical paths #1 and #2, and a setting as to which one of the optical paths #1 and #2 is to be set as a working or standby path may be controlled by, for example, the NMS described above.

FIG. 6 illustrates, as a non-limiting example, a state where the optical path #1 is set as a working path which is indicated by a solid line, and the optical path #2 is reserved and set as a restoration path which is indicated by a dotted line. The "reservation setting" may be considered as a state where a band to be used by the standby path is reserved at each node through which a standby path passes, in preparation for an occurrence of a failure or the like of a working path. The reservation of the usage band may be considered as, for example, a reservation of a transmission band of the WSS 22.

For example, in FIG. 6, when the working path #1 falls into an unusable state due to an occurrence of a failure or the like of the working path #1 in operation, the unusable state is detected by the add node #1 and the drop node #4 corresponding to a start node and an end node of the working path #1, respectively. The "detection" may be referred to as a "failure detection," for convenience.

The add node #1 and the drop node #4 transmit and receive signaling to/from each other according to a failure detection of the working path #1, such that the standby path #2 is controlled to be placed in a state where a main signal light can be communicated. Accordingly, an optical communication of the working path #1 may be relieved by the standby path #2. The above described "optical label information" may be considered to be corresponding to information capable of identifying the working path #1 and the standby path #2 in the example of FIG. 6.

When a change of an optical path is made, which includes a path switching processing (which may be referred to as a "recovery process" or a "relief process") according to such a path failure detection, a power level of light transmitted through the optical path after the change is readjusted. By the readjustment of the optical power level, for example, it is possible to ensure and guarantee a communication quality in the optical path after the change, which is equal to that of the optical communication through the optical path before the change.

In the readjustment of the optical power level, for example, a target level of the optical power for each wavelength is changed and adjusted according to the kinds of an optical fiber used in the optical transmission lines (2 and 3) that constitute the optical network, and transmission parameters such as a transmission loss, a transmission distance or the like.

For example, in the node 1 related to the optical path change, a VOA loss due to the WSS 22 is changed for each wavelength so that an optical transmission power of the node 1 is controlled. The VOA loss control of a wavelength unit may be referred to as a "channel power control." The "channel power control" may be, for example, performed in a state where the main signal light is communicated through the optical path.

For example, as described above with FIG. 2, the VOA controller 53 adjusts a VOA loss (i.e., a feed-back control) in the node 1 such that a power level of a main signal light monitored by the OCM 52 reaches a target level. Such an optical power control may be repeatedly performed for each node 1 so that a level diagram for the optical path may be optimized.

However, in the above described optical power control, for example, a time required for stabilizing the level diagram of the standby path is likely to be longer. Therefore, for example, a time required until a stable optical communication is enabled in the standby path after the occurrence of a failure or the like in the working path is likely to be prolonged.

A change of the optical path may be performed in a readjustment of the optical network (which may be referred to as "re-grooming") without being limited to a case of the occurrence of a failure or the like in the optical path. For example, with the dynamic route change (which may be referred to as "rerouting") that takes an advantage of an ROADM 1, a change of the optical path may be performed.

For example, in the ROADM 1, any one of wavelength-independent (Colorless), route-independent (Directionless) and wavelength collision-free (Contention less) functions may be achieved.

The ROADM 1 which achieves the wavelength-independent and route-independent functions may be referred to as a Colorless and Directionless (CD)-ROADM 1. The ROADM 1 which achieves three functions of the wavelength-independent, route-independent, and wavelength collision-free functions may be referred to as a Colorless, Directionless and Contention less (CDC)-ROADM 1.

In an optical network employing the CD-ROADM 1 or the CDC-ROADM 1, a route of a main signal light or a wavelength per route may be dynamically changed.

Meanwhile, with a recent increase of the capacity and speed of an optical network, it has also been attempted to increase a utilization efficiency of an available wavelength band (which may be referred to as a "system band").

For example, studies have been made to divide a system band by a flexible grid technology, or put together subdivided (e.g., fragmented) wavelengths (or wavelength bands) in a system band as much as possible through defragmentation by taking advantage of a flexible grid.

An optical path of a new main signal light may be allocated to a wavelength band put together through wavelength defragmentation so as to improve a utilization efficiency of a system band.

In the optical network employing the above described technology, there is a possibility that a dynamic optical route change may be frequently performed to improve a utilization efficiency of future value-added services or bands without being limited to a case of an occurrence of a failure of an optical path.

Accordingly, it may be said that a speed-up of the readjustment of a power level of light transmitted through the optical path is one of important considerations. Therefore, hereinafter, descriptions will be made on a speed-up of an optical power level control according to an optical path change at the time of an occurrence of a failure of an optical path, or re-grooming. That is, descriptions will be made on a speed-up of a VOA loss control by the VOA controller 53 of the node 1.

Figure 7:
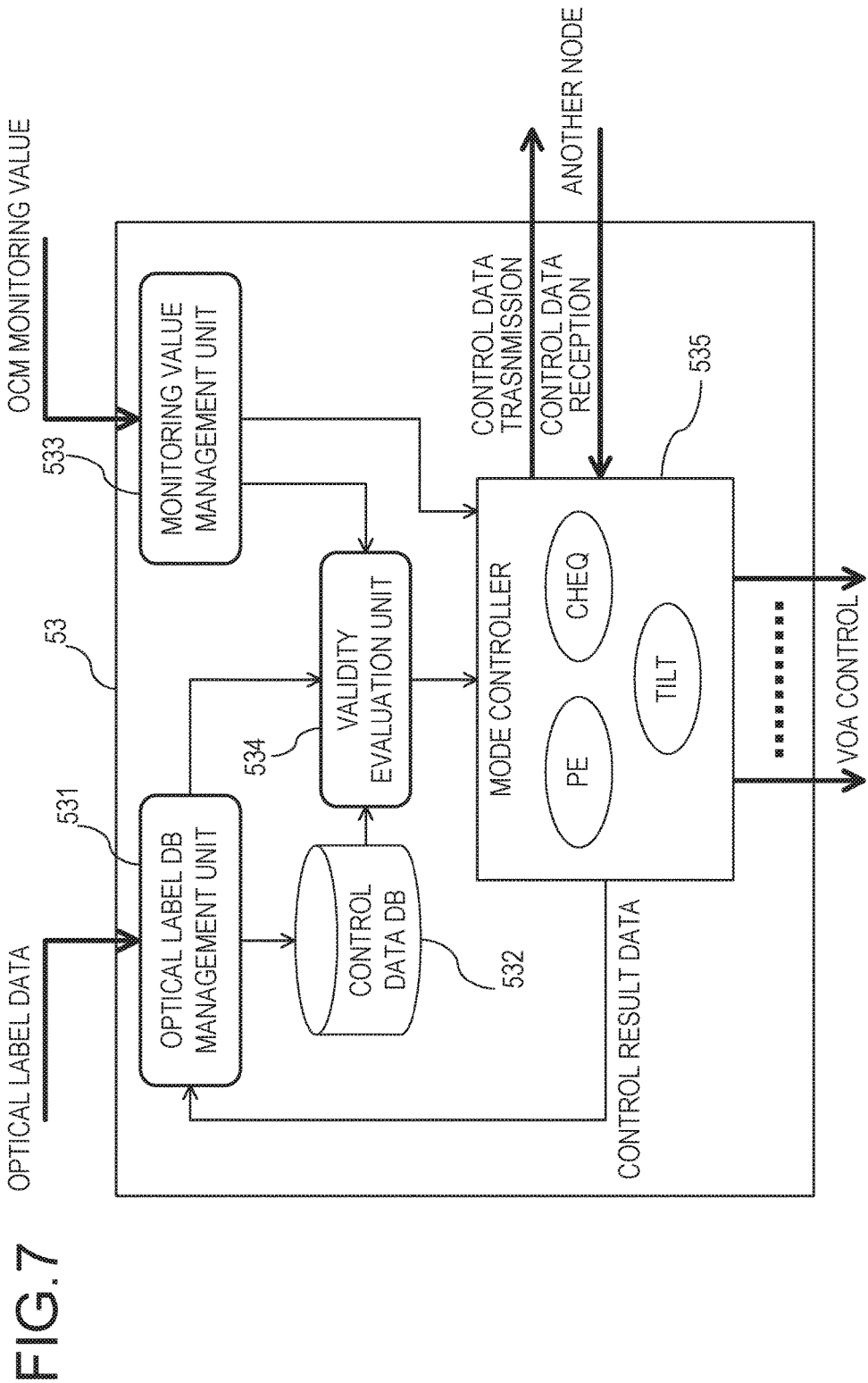
FIG. 7 is a block diagram illustrating an exemplary configuration of a VOA controller illustrated in FIGS. 2 and 6.

FIG. 7 is a block diagram illustrating an exemplary configuration of the VOA controller 53 illustrated in FIG. 2. The VOA controller 53 illustrated in FIG. 7, for example, includes an optical label database (DB) management unit 531, a control data DB 532, a monitoring value management unit 533, a validity evaluation unit 534, and a mode controller 535.

The optical label DB management unit 531 performs, for example, a registration (storage), a search, a deletion or the like of optical label data (hereinafter, which may be referred to as a "reception label") detected by the optical label monitor 51. The reception label may include information capable of identifying a signal source of a main signal light (which may be referred to as a "source node"), or information such as a modulation scheme, a signal rate, a transmission light source, a usage wavelength band or the like. For example, label information associated with any one combination of these information pieces may be displayed at the reception label.

The control data DB 532, for example, stores and manages control data used for a VOA loss control that was performed in the past in the own node 1, in association with the reception label managed by the optical label DB management unit 531. The control data may include, for example, data in which an optical power fluctuation amount of a subsequent node (e.g., a ROADM) and an interference value to other wavelengths with respect to an adjustment value for a VOA loss are indexed as multi-order moment components.

The control data DB 532 may be provided within the node 1, outside the VOA controller 53, or outside the transmission band controller 25 as indicated by the dotted line in FIG. 2.

The "control data" may be a control amount of a VOA loss as it is (which may be referred to as a "control width"), or information used for determining the control amount, or may include these in combination. The "control data" may be referred to as "control information," or may be referred to as "setting data" or "setting information."

Non-limiting examples of information used for determining the control amount of the VOA loss may include a channel power level, a kind of a main signal light, a number of multiplexed wavelengths of a WDM light (i.e., a number of channels), a route of an optical path, a kind of an optical fiber, a transmission loss, a transmission distance or the like. These information elements may be referred to as "transmission parameters" or "control parameters." The "kind of the main signal light" may be considered to be equivalent to a difference in a modulation scheme.

A control amount of the VOA loss, for example, may be determined using a plurality of transmission parameters in combination. The transmission parameters may be considered as information or variables indicating a "transmission condition" on a certain optical path of an optical network.

Accordingly, the "control data" may include information indicating the "transmission condition" for an optical path identified by a reception label. The "control data" stored and accumulated in the control data DB 532 are "past control data." That is, when a current time (a current point of time) is considered to be corresponding to a first timing, the "past control data" may be considered to be corresponding to "control data" at a second timing prior to the first timing.

The "past control data" are, for example, control data when an output optical power level of the WSS 22 has been stabilized (which may be referred to as "converged") at the target level by the VOA loss control that was performed in the past for the optical path identified by the reception label.

By comparing a transmission condition indicated by "past control data" to a transmission condition of a current certain optical path, it is possible to evaluate whether "past control data" can be reused for a channel power control of the certain optical path. The evaluation is performed by the validity evaluation unit 534.

In the present exemplary embodiment, the "control data" are data used for control of the VOA loss, and thus may be referred to as "VOA loss control data." Otherwise, since the control of the VOA loss corresponds to a transmission band control of the WSS 22, the "control data" may be referred to as "WSS control data." Since the WSS 22 to be controlled is an example of an optical device, the "control data" may be referred to as "optical device control data."

As described above, a reception label capable of identifying a signal source, a modulation scheme, a signal rate or the like, and control data when a channel power was stably converged in the past for an optical path identified by the corresponding reception label, are made into database in the NE of the optical network.

Then, in FIG. 7, the monitoring value management unit 533, for example, stores and manages a monitoring value (hereinafter, which may be referred to as an "OCM monitoring value") which is a monitoring result by the OCM 52 (see, e.g., FIG. 2). The OCM monitoring values may be managed in the monitoring value management unit 533 for individual ports. A "port" may be provided to correspond to a route through which a WDM light is transmitted (which may be referred to as a "WDM line"). For example, when the node 1 has a HUB configuration capable of accommodating a plurality of WDM lines, the OCM monitoring values may be managed by information capable of identifying respective WDM lines (e.g., port identifiers).

All of the optical label DB management unit 531, the control data DB 532, and the monitoring value management unit 533 may be implemented using, for example, a storage unit, a storage device or a storage medium. The storage unit, the storage device, and the storage medium may be collectively referred to as a "memory" for convenience.

Therefore, the optical label DB management unit 531, the control data DB 532, and the monitoring value management unit 533 may be referred to as memories 531, 532 and 533, respectively, for convenience. The respective memories 531 to 533 may be physically separate memories, or a part of them may be physically integrated into one memory.

That is, a part or all of the memories 531 to 533 may be considered to correspond to storage areas distinguished by addresses in a single physical memory. A "memory" may employ a random access memory (RAM), a hard disk drive (HDD), a solid state drive (SSD) or like.

Then, in FIG. 7, the validity evaluation unit 534 searches the control data DB 532 based on a reception label, and evaluates the validity of the corresponding control data, that is, whether the control data may be re-used for the current channel power control, based on the past hit control data and a current OCM monitoring value.

For example, when a difference (or a degree of similarity) between control data when a VOA loss is controlled to be a target value based on the current OCM monitoring value and the past control data is within a predetermined allowable range, the validity evaluation unit 534 may evaluate that the past control data may be re-used. Meanwhile, when the corresponding difference is out of the allowable range, the validity evaluation unit 534 may evaluate that the re-use of the past control data is not proper.

The validity evaluation unit 534 provides the past control data to the mode controller 535 according to the evaluation result indicating that the past control data may be re-used.

When the past control data are provided from the validity evaluation unit 534, the mode controller 535 controls a VOA loss of the WSS 22 according to the corresponding control data.

For example, the mode controller 535 may control the attenuation amount of each VOA 223 illustrated in FIG. 2 by a channel unit, according to the control data provided from the validity evaluation unit 534. By the VOA loss control based on the past control data, a time until an optical transmission power level of the node 1 is converged on a target level may be decreased.

In other words, it is possible to achieve an increase of a start-up speed of the WSS 22 as an example of an optical device, and further, it is possible to achieve an increase of a start-up speed of an optical path (which may be referred to as a "channel path") of a specific channel. Therefore, the VOA loss control based on the past control data may be referred to as a "high-speed mode control" for convenience.

Meanwhile, when the validity evaluation unit 534 evaluates that the re-use of the past control data is not proper, the mode controller 535 may normally perform a VOA loss control based on the current OCM monitoring value. The normal VOA loss control based on the current OCM monitoring value may be referred to as a "normal mode control" for convenience.

As described above, the mode controller 535 is capable of selectively performing the high-speed mode control and the normal mode control according to the validity evaluation result of re-use of the past control data by the validity evaluation unit 534.

The target value of the control amount of a VOA loss control by the mode controller 535 may be set based on an OCM monitoring value of the own node 1 obtained for each wavelength in the OCM 52, and an OCM monitoring value (or a correction value thereof) for each wavelength notified from another node.

For example, the target value of a control amount of a VOA loss may be set as a total of the OCM monitoring value of the own node 1 and the correction value notified from another node (which may be referred to as "feed-back").

Therefore, the mode controller 535 is capable of transmitting and receiving latest control data to/from a node 1 separate from the own node 1.

The target value of a control amount of a VOA loss may be set in consideration of a pre-emphasis (PE) amount or a channel equalization (CHEQ) on the main signal light, a gain tile (TILT) or the like. The "PE" or "CHEQ," or "TILT" may be calculated based on transmission parameters.

Figure 8:
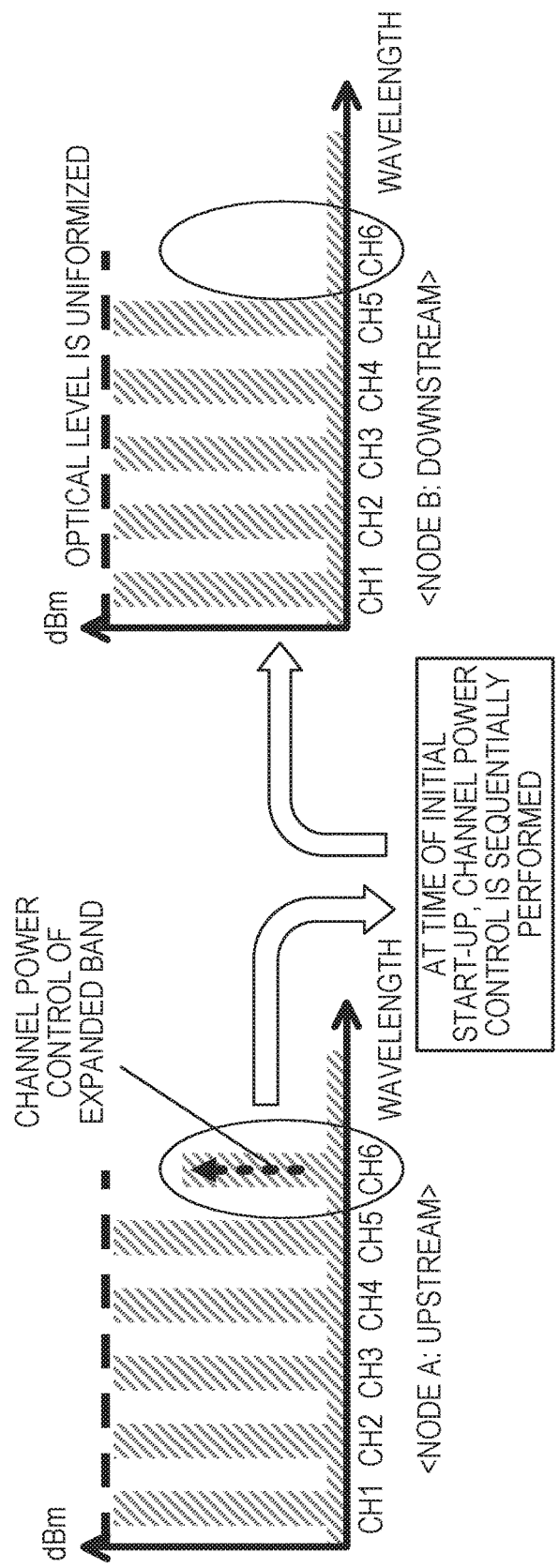
FIG. 8 is a schematic view illustrating an example of a channel power control according to an exemplary embodiment.
Figure 9:
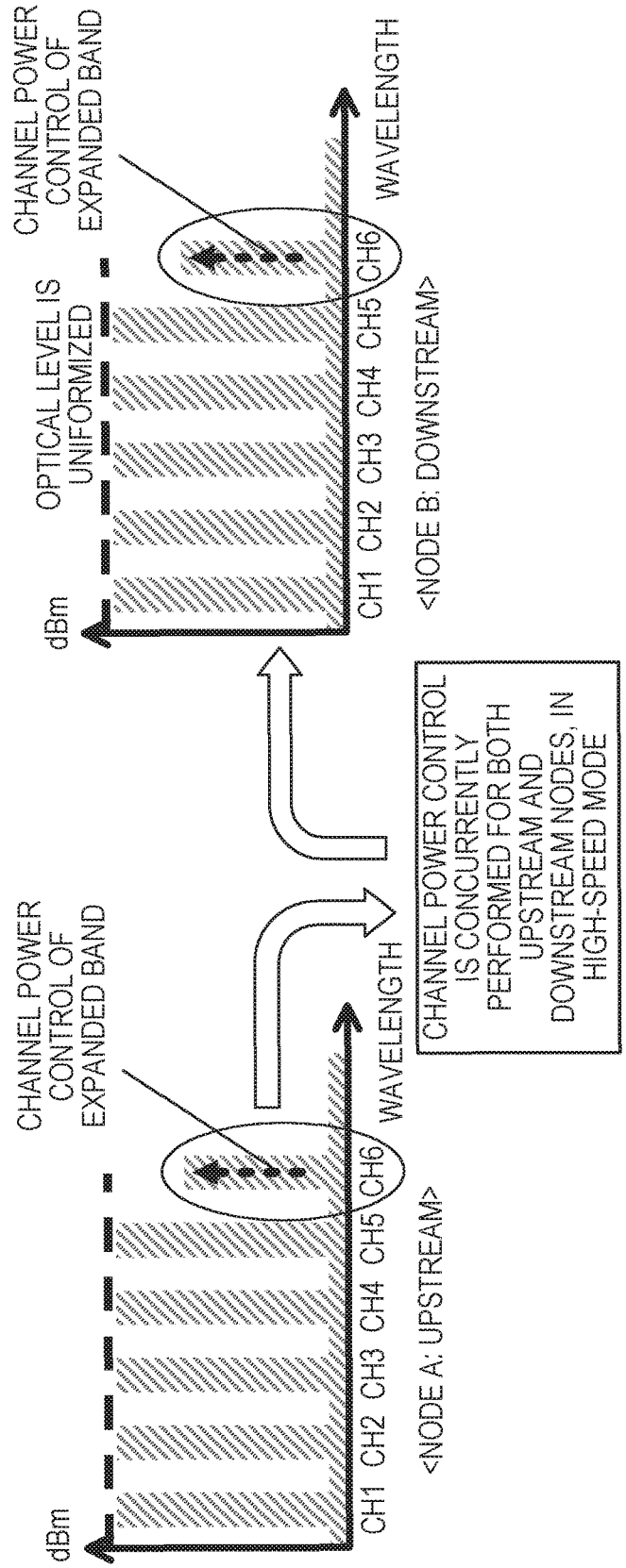
FIG. 9 is a schematic view illustrating an example of a channel power control according to an exemplary embodiment.

FIG. 8 illustrates an example where a VOA loss control (a channel power control) of a wavelength unit is performed in a normal mode control at the time of initial start-up of the optical network. FIG. 9 illustrates an example where a channel power control is performed in a high-speed mode control at the time of initial start-up of the optical network.

In FIGS. 8 and 9, it is assumed that a channel CH6 is added to channels CH1 to CH5 which are in operation in the WDM light. In FIGS. 8 and 9, a node A corresponds to an upstream node located at the upstream side of a transmission direction of a WDM light as a main signal light, and a node B corresponds to a downstream node located at the downstream side of the transmission direction.

In the example of FIG. 6, the add node #1 corresponds to an "upstream node" with respect to the through nodes #2 and #3, and the drop node #4. The through nodes #2 and #3 correspond to the "downstream nodes" with respect to the add node #1, and correspond to the "upstream nodes" with respect to the drop node #4. The drop node #4 corresponds to a "downstream node" with respect to the through nodes #2 and #3, and the add node #1.

As illustrated in FIG. 8, in the normal mode control, a channel power control of the additional channel CH6 may be performed, for example, sequentially from the upstream node A to the downstream node B in order to avoid an interference of the upstream node A and the downstream node B in the channel power control.

In contrast, in the example of FIG. 9, after the target channel CH6 of a channel power control is grasped, the channel power control is performed through a high-speed mode control so as to avoid an interference between the upstream node A and the downstream node B in the channel power control.

Therefore, the channel power control may be performed through the high-speed mode control in parallel with the upstream node A and the downstream node B, and a total control time for an optical path of the additional wavelength CH6 may be decreased.

Subsequently, with reference to FIG. 10, descriptions will be made on an example of a channel power control by a normal mode control which is performed at the time of initial start-up. At the time of initial start-up, since the optical label data and control data are not yet sufficiently accumulated in the VOA controller 53 of each NE of an optical network, the "sequential-start-up" by the "normal mode control" illustrated in FIG. 8 is performed.

For example, in FIG. 6, each of the nodes #1 and #3 performs a setting of the standby path #2 with respect to the working path #1 according to a control from the NMS (operation P11). For example, the nodes #1 and #3 perform a band reservation of a wavelength corresponding to the standby path #2 in relation to the WSS 22 according to a control from the NMS. The setting of the standby path #2 in relation to the relay node #3 may be controlled by the start node #1 controlled from the NMS, in place of the NMS.

The start node #1 of the working path #1 and the standby path #2 transmits a main signal light to the working path #1 and a training signal light to the standby path #2 (operation P12). The training signal light may be referred to as a test signal light or a pilot signal light. The training signal light may employ, for example, a signal light having a specific test pattern signal component. The test pattern signal may employ, for example, a signal in which a pseudo-random bit sequence (PRBS) is inserted, instead of a transmission data signal (which may be referred to as a "client signal").

Then, the start node #1 performs a channel power control on each of the working path #1 and the standby path #2 by a normal mode control based on the OCM monitoring value.

For example, the node #1 controls a VOA loss of the WSS 22 corresponding to each of the working path #1 and the standby path #2 by the VOA controller 53 such that the OCM monitoring value (i.e., an optical transmission power of the node #1) coincides with a target power.

Figure 10:
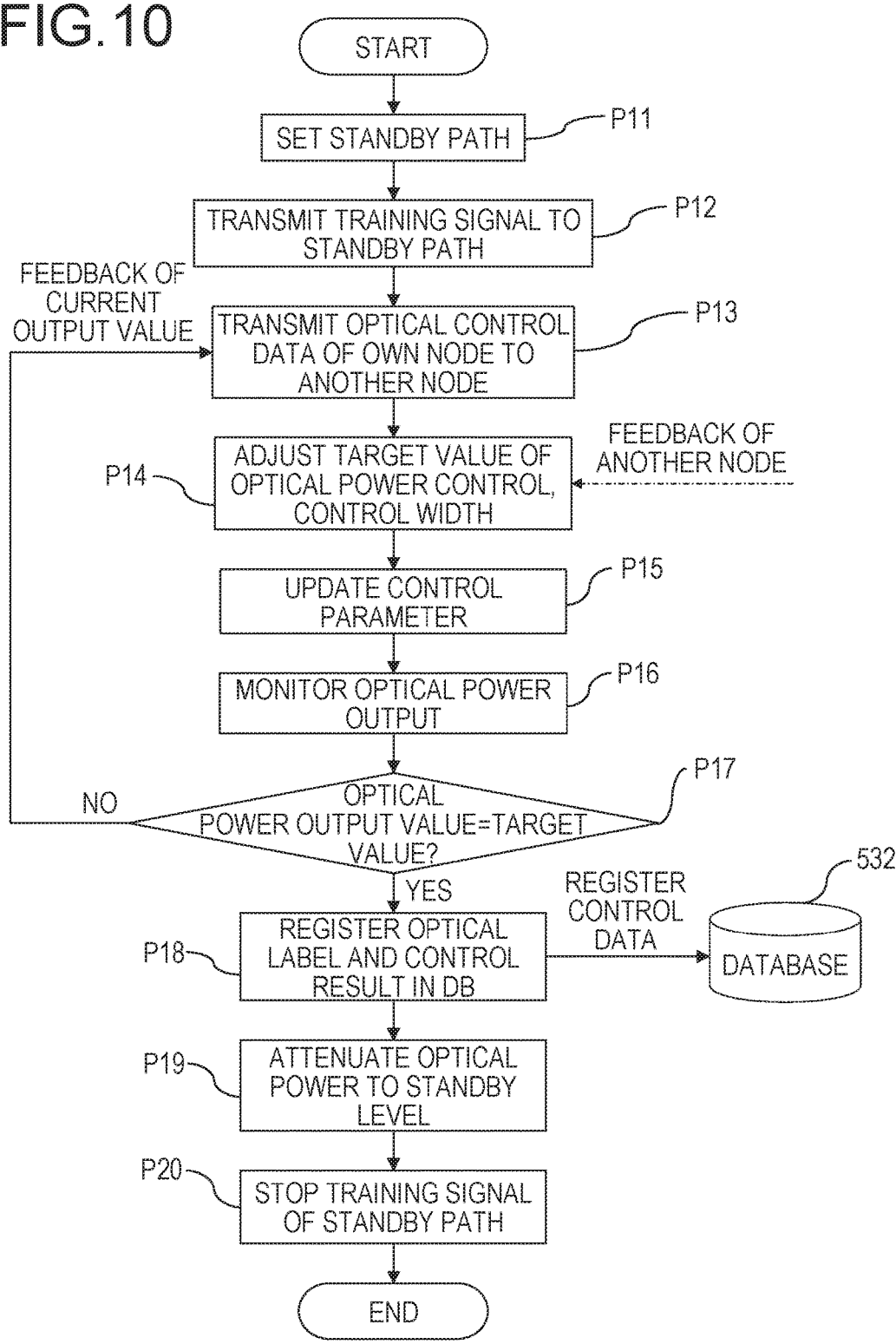
FIG. 10 is a flow chart illustrating an example of a channel power control according to an exemplary embodiment.

The corresponding channel power control corresponds to, for example, a loop process indicated by the operations P13 to P17 of FIG. 10 and the NO route of operation P17. For example, the node #1 adjusts a VOA loss of the WSS 22 corresponding to each of the paths #1 and #2 by the VOA controller 53 (operation P14) until the OCM monitoring value obtained in operation P16 coincides with a target value (until YES determination in operation P17). According to the adjustment, the WSS control data are updated (operation P15).

The adjustment of the VOA loss (operation P14) may be performed in consideration of feedback information from other nodes, for example, the downstream nodes #2 and #3. The feedback information, for example, may be information indicating a reception optical power level at the downstream nodes #2 and #3.

Accordingly, the node #1 may perform an optimization control of a channel power of each of the paths #1 and #2 by controlling the VOA loss based on the OCM monitoring value of the own node #1, and the reception optical power level information at the other nodes #2 and #3.

In the process of the channel power control, the start node #1 may notify the WSS control data to the downstream nodes #2 and #3 whenever the WSS control data are updated (operation P13). Meanwhile, the frequency of notification may be properly adjusted. For the notifications of the WSS control data to the other nodes #2 and #3, SV light may be used.

Then, when the OCM monitoring value coincides with the target value (YES in operation P17), the node #1 registers the WSS control data at that time in the control data DB 532 (see, e.g., FIG. 7) in association with optical label information of the standby path #2 (operation P18).

When the WSS control data are completely registered in the control data DB 532, the node #1 controls, for example, the VOA loss for the standby path #2 to attenuate a power level of a transmission light to the standby path #2 to a standby level (operation P19). The "standby level" may be, for example, a level at which the downstream nodes #2 to #4 are capable of receiving and identifying optical label information. The "standby level" may be set to a level larger than an optical power level (which may be referred to as an "initial level") at the time of a transmission initiation of a training signal light (at the time of initial start-up), and may be set smaller than the target level.

Figure 12:
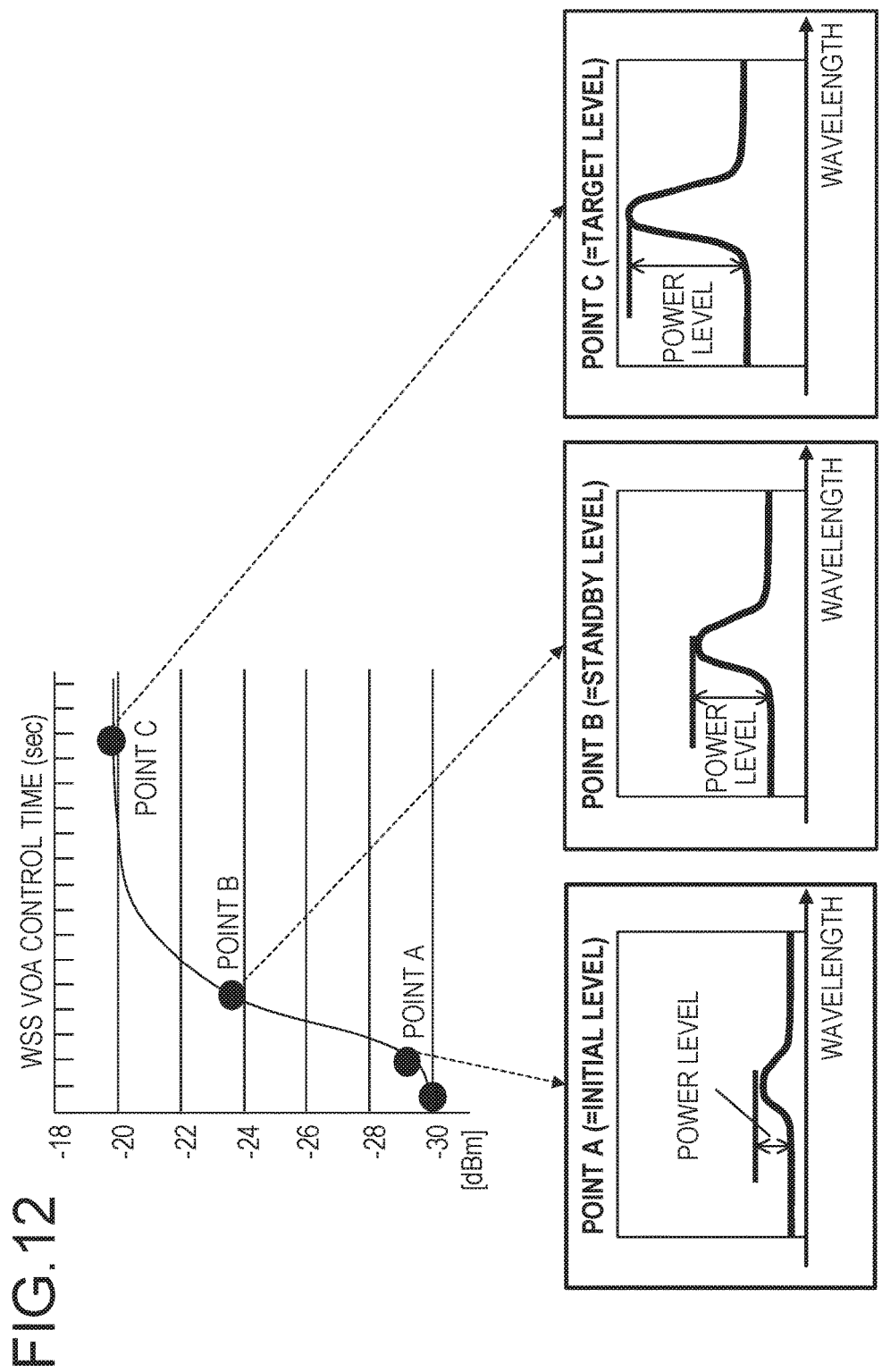
FIG. 12 is a view illustrating an example of a channel power control according to an exemplary embodiment.

FIG. 12 illustrates an example of a relationship between an initial level, a standby level, and a target level. In FIG. 12, Points A, B and C indicate an initial level, a standby level, and a target level, respectively, and each of these Points may be considered to represent an output optical power level of a WSS transmission band.

Point A may be considered as a point corresponding to an output optical power level of a WSS transmission band at the time of initial start-up.

Point B may be considered to represent a standby level at which optical label information can be received and identified, and considered to correspond to, for example, a level that satisfies a minimum reception sensitivity of optical label information.

Point C represents, for example, a target level at which a main signal light may be communicated in an error-free state.

The node #1 may attenuate a power of transmission light to the standby path #2 to a standby level, and then stop the transmission of a training signal light to the standby path #2 (operation P20 of FIG. 10).

The above described operations P13 to P18 may be performed even in each of the downstream nodes #2 and #3 located at the downstream side of the start node #1. That is, each of NEs that constitute the optical network may perform each of WSS control data acquisition, DB registration, and notification to another node based on a main signal light in relation to the working path #1, and based on a training signal light in relation to the standby path #2.

As described above, in each of NEs that constitute the optical network, in relation to each of the working path #1 and the standby path #2, the WSS control data may be made into DB.

Next, with reference to FIG. 11, descriptions will be made on an example of a processing at the node #3 on the standby path #2 in a case where after in-service of the working path #1, a switching trigger to the standby path #2 has occurred. The switching trigger may be generated and detected according to a restoration request in a case of occurrence of a failure or the like in the working path #1, or a rerouting request at the time of re-grooming.

Figure 11:
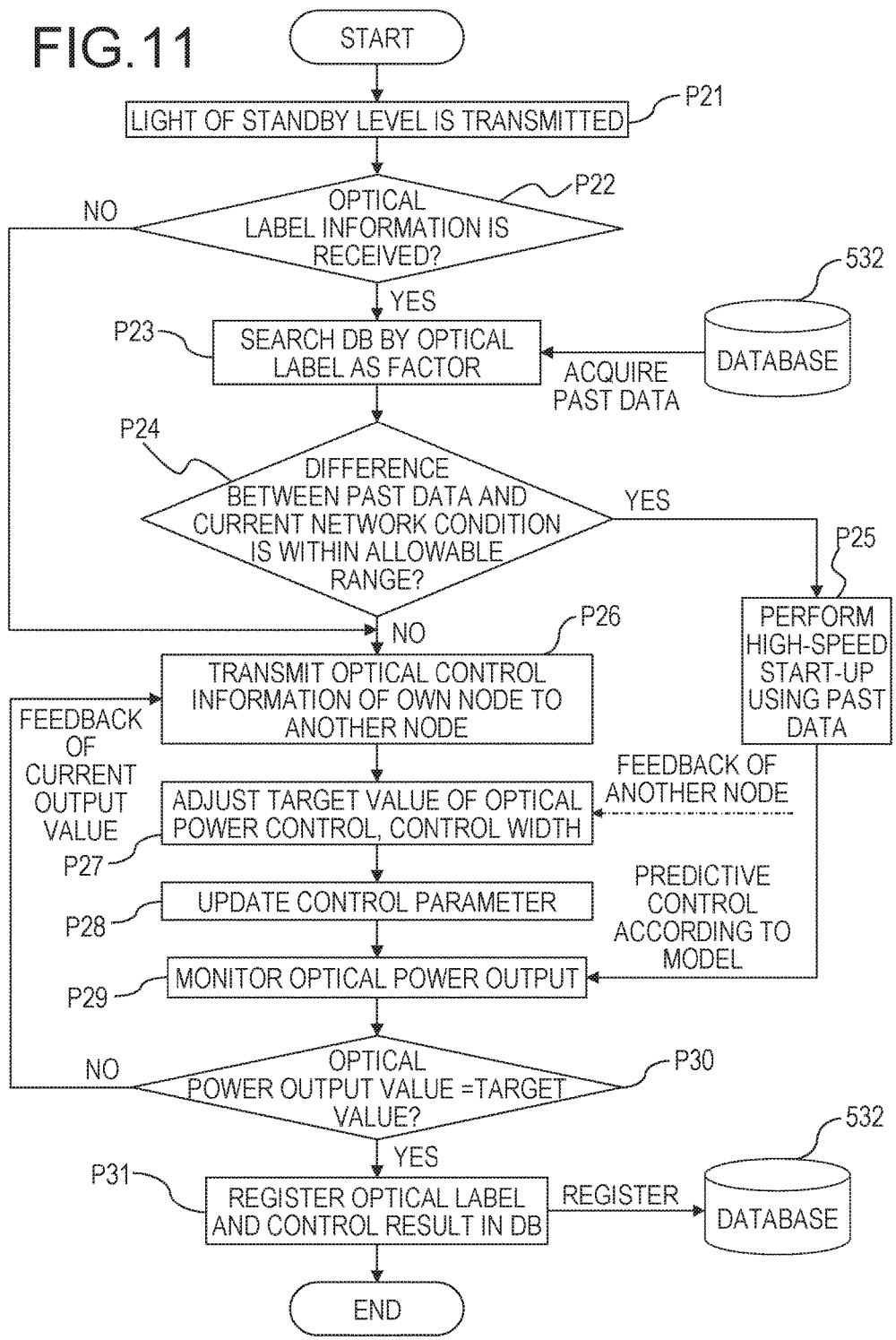
FIG. 11 is a flow chart illustrating an example of a channel power control according to an exemplary embodiment.

As illustrated in FIG. 11, as described above, a light of a standby level has been transmitted to the standby path #2 (operation P21). Here, each of the start node #1 and the downstream node #3 of the standby path #2 performs a VOA loss control of a WSS transmission band by the VOA controller 53 such that the downstream nodes #3 and #4 may detect optical label information from a received light of the standby level. Accordingly, each of the downstream nodes #3 and #4 of the standby path #2 may concurrently detect the optical label information from the received light of the standby level, and achieve a reduction of a time required for control based on the optical label information.

When a reception of optical label information is detected by the optical label monitor 51 (YES in operation P22), the VOA controller 53 (e.g., the validity evaluation unit 534) searches the control data DB 532 by using the corresponding optical label information as a key (operation P23).

The validity evaluation unit 534 checks (evaluates) whether a difference between past WSS control data obtained the corresponding search and WSS control data when a VOA loss is controlled to be a target value based on the current OCM monitoring value is within an allowable range (operation P24).

When the control data are multivariable depending on a plurality of parameters, the evaluation may be performed by obtaining a degree of similarity (or a correlation) between respective control data using, for example, a multivariate analysis such as a Mahalanobis distance. It can be considered that a difference between control data is decreased as the degree of similarity increases.

When the difference is within the allowable range (YES in operation P24), the validity evaluation unit 534 determines that re-use of the past WSS control data acquired from the control data DB 532 is proper, and provides the past WSS control data to the mode controller 535. Accordingly, the mode controller 535 performs a VOA loss control by a high-speed mode control (operation P25).

Figure 13:
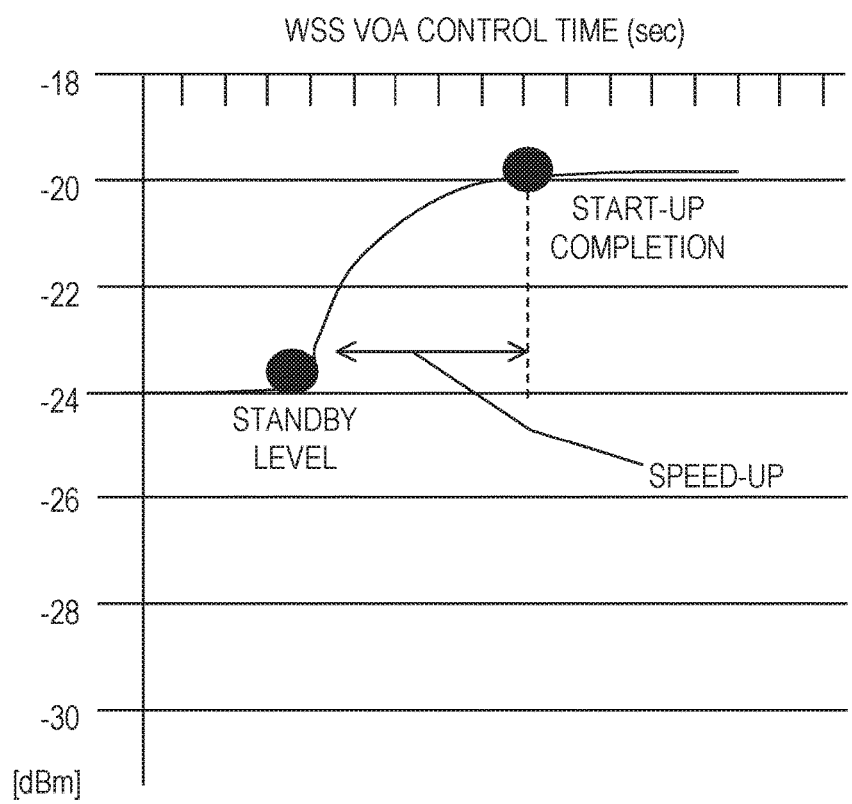
FIG. 13 is a view illustrating an example of an effect of a channel power control according to an exemplary embodiment.

Here, as illustrated in FIG. 13, since the control to the target level is performed using, as a start point, the standby level rather than an initial level, a time required for start-up completion of the standby path #2 may be shortened.

For the high-speed mode control, a predictive control based on an internal model obtained by modeling the past WSS control data accumulated in the control data DB 532 may be used. The corresponding predictive control will be described later with reference to FIG. 14.

Meanwhile, when a reception of optical label information is not detected in operation P22 (a case with NO) and it is evaluated that re-use of the past control data is not proper in operation P24 (a case with NO), the VOA controller 53 may perform a VOA loss control by a normal mode control.

For example, the VOA controller 53 may perform a loop process indicated by operations P26 to P30 of FIG. 11 and NO route of operation P30. For example, the node #3 adjusts a VOA loss of the WSS 22 corresponding to the standby path #2 by the VOA controller 53 (operation P27) until the OCM monitoring value obtained in operation P29 coincides with a target value (until YES determination in operation P30). According to the adjustment, the WSS control data are updated (operation P28).

The OCM monitoring value obtained in operation P29 may be a value in which a control result is reflected when the high-speed mode control has been performed in operation P25.

The adjustment of the VOA loss (operation P27) may be performed in consideration of feedback information from another node, for example, the downstream node #4. The feedback information may be, for example, information indicating a reception optical power level at the downstream node #4.

Accordingly, the node #3 may perform an optimization control of a channel power of the standby path #2 by controlling the VOA loss based on the OCM monitoring value of the own node #3, and the reception optical power level information at the other node #4.

In the process of the channel power control, the node #3 may notify the WSS control data to the downstream node #4 whenever the WSS control data are updated (operation P26). Meanwhile, the frequency of notification may be properly adjusted. For the notification of the WSS control data to the other node #4, an SV light may be used. When the other node #4 is a through node, the same process as that for the node #3 as described above may be performed for the corresponding through node.

Subsequently, when the OCM monitoring value coincides with the target value (YES in operation P30), the node #3 registers the WSS control data at that time in the control data DB 532 (see, e.g., FIG. 7) in association with optical label information of the standby path #2 (operation P31). Then, the node #3 may repeat the process by returning to operation P21. In the control data DB 532, latest WSS control data are being registered and stored.

The standby path #2 may be set as a shared mesh restoration (SMR) path which is shared by a plurality of working paths. A determination as to which one of the plurality of working paths is to be relieved by the standby path #2 set as the SMR path is not made until a switching trigger actually occurs.

However, the node #3 is placed in at least a standby level state at which the node can receive and identify optical label information, and thus, is capable of detecting that a change has occurred in the optical label information transmitted through the start node #1, according to the occurrence of the switching trigger.

Accordingly, when a change has occurred in the optical label information of which reception has been detected as described above in operation P22, the VOA controller 53 is capable of identifying a working path to be relived from the changed optical label information. The VOA controller 53, in the operation P23 as described above, may search the control data DB 532 by using the changed optical label information as a key.

As described above, each NE (e.g., each of a plurality of NEs) on the standby path #2 may be placed at the standby level at which it is capable of receiving and identifying optical label information. Accordingly, in view of the optical network level, as illustrated in FIG. 9, all NEs of the standby path #2 are capable of concurrently performing a start-up control of the WSS transmission band power level through a high-speed mode control.

Figure 14:
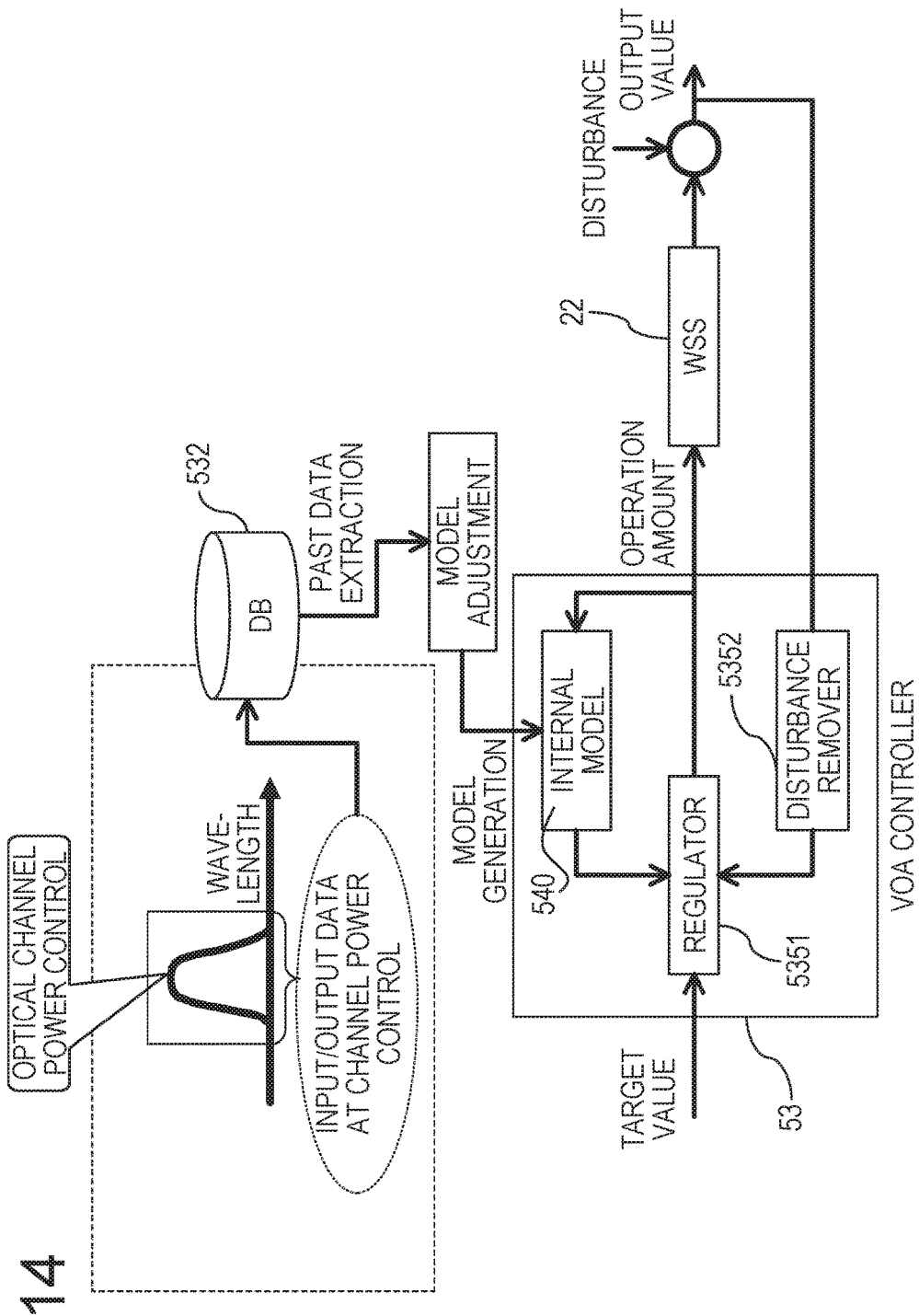
FIG. 14 is a block diagram illustrating a predictive control of a channel power control by the VOA controller illustrated in FIGS. 2, 6, and 7.

Next, descriptions will be made on a predictive control based on an internal model at the time of a high-speed mode control with reference to FIG. 14. FIG. 14 illustrates, for example, a state where past control data are extracted from the control data DB 532 so that a model adjustment process is performed to generate an internal model 540.

Based on the generated internal model 540, the VOA controller 53 (e.g., the mode controller 535) performs a predictive control at the time of high-speed mode control.

For example, a regulator 5351 provides a control amount of the VOA loss (which may be referred to as an "operation amount") according to a target value of a VOA loss to the WSS 22. According to the corresponding operation amount, the internal model 540 performs a feedback control of an output operation amount of the regulator 5351.

A disturbance applied to an output of the WSS 22 may be removed by, for example, a disturbance remover 5352.

By the predictive control as described above, the mode controller 535 may perform a high-speed mode control without waiting for feedback of an OCM monitoring value or feedback of control data from another node.

Accordingly, it is possible to further reduce a start-up control time of the standby path #2 from a standby level to a target level as illustrated in FIG. 13.

As described above, the NE constituting the optical network accumulates the past control data for a control of a transmission channel power to an optical path, and maintains the accumulated data as DB. Then, at the time of optical path change accompanied with a failure occurrence of the optical path or a re-grooming, the NE controls the transmission channel power to an optical path of a changed destination by using reusable past control data.

Accordingly, a time until the channel power of the optical path of the changed destination reaches a target value may be reduced, so as to speed up the recovery of a path failure or a re-grooming of an optical network.

Since the optical path is identified by optical label information, even if an optical path of a changed destination is set as a SMR path, a channel power control may be performed by a high-speed mode control for the corresponding SMR path. Accordingly, it is possible to perform a high-speed optical path change control that is capable of achieving a performance and quality of a carrier grade.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical transmission device in an optical network in which a first optical path and a second optical path are set, the optical transmission device locating on the second optical path, the optical transmission device comprising:
a storage unit configured to store control data for a control of an optical transmission power to the second optical path, the control being performed based on a training signal received through the second optical path; and
a controller configured to control the optical transmission power to the second optical path, based on the control data stored in the storage unit, according to a detection of an optical path change by which an optical path transmitting a main signal is changed from the first optical path to the second optical path.

2. The optical transmission device according to claim 1, further comprising:
a variable optical attenuator configured to vary an attenuation amount of the optical transmission power to the second optical path,
wherein the control data are data used for a control of the attenuation amount.

3. The optical transmission device according to claim 1, wherein the controller includes a detector configured to detect optical label information superimposed on the training signal, the optical label information being capable of identifying the second optical path, and
wherein the optical path change is detected, based on a change in the optical label information detected by the detector.

4. The optical transmission device according to claim 1, wherein the controller includes
a monitor configured to monitor the optical transmission power to the second optical path, and
an evaluation unit configured to evaluate a validity of re-use of the control data stored in the storage unit, based on a current monitoring result by the monitor, and
wherein the control data evaluated to be proper for the re-use by the evaluation unit is utilized for the control of the optical transmission power to the second optical path.

5. The optical transmission device according to claim 1, wherein the first optical path is set as a working path, and the second optical path is set as a standby path for the working path.

6. The optical transmission device according to claim 3, wherein the training signal is transmitted at a power level at which the detector is capable of accurately identifying the optical label information, and wherein the power level is larger than an initial level at a transmission initiation of the training signal, and smaller than a target level of the optical transmission power to the second optical path.

7. The optical transmission device according to claim 5, wherein the standby path is a shared mesh restoration path shared by a plurality of working paths including the working path.

8. An optical transmission system in which a first optical path and the second optical path are set, the optical transmission system comprising:
   a transmission node located on the first optical path and the second optical path; and
   a relay node located on the second optical path between the transmission node and a reception node located on the first optical path and the second optical path,
   wherein the transmission node includes a transmitter configured to transmit a training signal to the second optical path, and
   wherein the relay node includes
   a storage unit configured to store control data for a control of an optical transmission power to the second optical path in a direction toward the reception node, the control being performed based on the training signal received through the second optical path; and
   a controller configured to control the optical transmission power to the second optical path, based on the control data stored in the storage unit, according to a detection of an optical path change by which an optical path transmitting a main signal is changed from the first optical path to the second optical path.

9. An optical transmission control method comprising:
   transmitting a training signal from a transmission node located on a first optical path and a second optical path to the second optical path;
   storing, in a storage unit, control data for a control of an optical transmission power to the second optical path in a direction toward a reception node located on the first optical path and the second optical path, in a relay node located on the second optical path between the transmission node and the reception node, the control being performed based on the training signal received through the second optical path; and
   controlling the optical transmission power to the second optical path, based on the control data stored in the storage unit, according to a detection of an optical path change by which an optical path transmitting a main signal is changed from the first optical path to the second optical path in the relay node.

* * * * *